United States Patent [19]

Burgdorf et al.

[11] Patent Number: 5,683,150
[45] Date of Patent: Nov. 4, 1997

[54] HYDRAULIC BRAKE SYSTEM WITH SLIP CONTROL

[75] Inventors: Jochen Burgdorf, Offenbach-Rumpenheim; Peter Volz, Darmstadt; Dieter Dinkel, Eppstein/Ts, all of Germany

[73] Assignee: ITT Automotive Europe GmbH, Frankfurt, Germany

[21] Appl. No.: 557,141

[22] PCT Filed: May 13, 1994

[86] PCT No.: PCT/EP94/01541

§ 371 Date: Dec. 8, 1995

§ 102(e) Date: Dec. 8, 1995

[87] PCT Pub. No.: WO94/29150

PCT Pub. Date: Dec. 22, 1994

[30] Foreign Application Priority Data

Jun. 9, 1993 [DE] Germany .............. 43 19 227.0

[51] Int. Cl.[6] ................................................ B60T 8/44
[52] U.S. Cl. ................... 303/116.1; 303/116.2; 303/119.2; 303/900; 303/DIG. 2
[58] Field of Search ............... 303/119.2, 119.1, 303/900, 901, 68, 116.1, 113.1, 113.5, 186, 187, 9.75, 9.62, 84.1, 84.2, 115.1, DIG. 1, DIG. 2, 115.4, 115.5, 116.4, 104.2, 117.1, 116.2; 188/349; 137/495, 509, 596.17; 251/129.19

[56] References Cited

U.S. PATENT DOCUMENTS

| 3,512,844 | 5/1970 | Stelzer .................... 188/349 |
| 3,617,098 | 11/1971 | Leiber .................... 303/119.1 |
| 3,663,067 | 5/1972 | Yabuta .................... 188/349 |

(List continued on next page.)

FOREIGN PATENT DOCUMENTS

| 0347274 | 12/1989 | European Pat. Off. . |
| 2139140 | 1/1973 | France . |
| 2680742 | 3/1993 | France . |
| 3743588 | 12/1957 | Germany . |
| 3744070 | 12/1957 | Germany . |
| 2643860 | 9/1976 | Germany . |
| 3427802 | 7/1984 | Germany . |
| 4010842 | 12/1987 | Germany . |
| 3914953 | 5/1989 | Germany . |
| 3924085 | 7/1989 | Germany . |
| 4010841 | 4/1990 | Germany . |
| 4121603 | 6/1991 | Germany . |
| 4003328 | 8/1991 | Germany .............. 303/116.2 |

(List continued on next page.)

OTHER PUBLICATIONS

Search Report from German Patent Office for Application No. P4319227.0.

Bosch Technische Berichte, Band 7 (1980) Heft 2 ISSN 0006-789X, Antiblockiersystem (ABS), H. Lieber et al.

"Fahrwerktechnik: Radschlupf-Regelsysteme"; Vogel Fachbuch Herausgeber Prof. Dipl-Ing Jornsen Reimpell, copyright 1993.

*Primary Examiner*—Douglas C. Butler
*Attorney, Agent, or Firm*—J. Gordon Lewis; Thomas N. Twomey

[57] ABSTRACT

A hydraulic brake system with slip control, including a braking pressure generator hydraulically connected to at least one wheel brake by way of a main pressure line, a return line connected to the wheel brake and to the suction side of an auxiliary-pressure pump, an auxiliary-pressure line hydraulically connected to the braking pressure generator, and inlet and outlet valves inserted into the main pressure line and the return line and either closing or keeping open the pressure fluid passage in the main pressure line and in the return line, wherein a restrictor is controllable in the main pressure line between the inlet valve and the wheel brake permitting an unhindered hydraulic fluid passage in the main pressure line to the wheel brake in a first operating position, while the restrictor limits the pressure fluid flow to the wheel brake in another operating position.

11 Claims, 3 Drawing Sheets

U.S. PATENT DOCUMENTS

| | | | |
|---|---|---|---|
| 3,669,504 | 6/1972 | Stokes | 188/349 |
| 4,466,671 | 8/1984 | Miyasaka | 188/349 |
| 4,619,289 | 10/1986 | Tsuru et al. | 303/119.2 |
| 4,632,467 | 12/1986 | Kircher et al. | 303/113.5 |
| 4,668,026 | 5/1987 | Nakanishi et al. | 303/119.2 |
| 4,679,589 | 7/1987 | Inden et al. | 303/119.2 |
| 4,778,222 | 10/1988 | Numata et al. | 303/113.5 |
| 4,787,684 | 11/1988 | Schonlau et al. | 303/186 |
| 4,800,289 | 1/1989 | Adachi et al. | 303/900 |
| 4,898,430 | 2/1990 | Becker-Endrigkeit et al. | 303/113.1 |
| 4,943,123 | 7/1990 | Takeda et al. | 303/113.5 |
| 4,957,330 | 9/1990 | Morikawa et al. | |
| 5,007,687 | 4/1991 | Kircher et al. | 303/119.1 |
| 5,021,957 | 6/1991 | Yoshino et al. | 303/113.5 |
| 5,076,538 | 12/1991 | Mohr et al. | 303/119.2 |
| 5,152,589 | 10/1992 | Ocvirk | 303/900 |
| 5,167,442 | 12/1992 | Alaze et al. | 303/119.2 |
| 5,180,211 | 1/1993 | Weise et al. | 303/113.5 |
| 5,203,617 | 4/1993 | Wilde | 303/119.2 |
| 5,209,552 | 5/1993 | Reinartz et al. | 303/116.1 |
| 5,242,216 | 9/1993 | Miyawaki et al. | 303/119.2 |
| 5,265,948 | 11/1993 | Holzmann et al. | 303/900 |
| 5,267,782 | 12/1993 | Engfer | 303/900 |
| 5,290,098 | 3/1994 | Burgdorf et al. | 303/119.1 |
| 5,297,861 | 3/1994 | Morita et al. | 303/9.75 |
| 5,335,983 | 8/1994 | Beck et al. | 303/119.2 |
| 5,335,984 | 8/1994 | Alaze et al. | 303/900 |
| 5,350,226 | 9/1994 | Burgdorf et al. | 303/900 |
| 5,362,140 | 11/1994 | Burgdorf | 303/119.1 |
| 5,370,450 | 12/1994 | Volz et al. | 303/119.2 |
| 5,388,899 | 2/1995 | Volz et al. | 303/119.2 |
| 5,417,483 | 5/1995 | Sigl | 303/113.5 |
| 5,435,638 | 7/1995 | Bayliss | 303/119.2 |

FOREIGN PATENT DOCUMENTS

| | | | |
|---|---|---|---|
| 4016748 | 12/1991 | Germany | 303/116.1 |
| 4023708 | 1/1992 | Germany | 303/113.1 |
| 4213710 | 4/1992 | Germany | |
| 4-189656 | 7/1992 | Japan | 303/900 |
| 2169975 | 7/1986 | United Kingdom | 303/116.1 |
| 2253886 | 9/1992 | United Kingdom | 303/116.2 |
| WO9011212 | 11/1990 | WIPO | |
| WO9012713 | 11/1990 | WIPO | |

HYDRAULIC BRAKE SYSTEM WITH SLIP CONTROL

TECHNICAL FIELD

The present invention relates to a hydraulic brake system with slip control.

BACKGROUND OF THE INVENTION

The discontinuous pressure fluid control in slip-controlled brake systems using digitally controllable inlet and outlet valves causes undesirable noise emission due to the pulse-like pressure variation.

Therefore, various provisions for reducing the noise level during the ABS/TCS control phases have been proposed. Among others, international patent application PCT/EP 00 266 is referred to. This application discloses the arrangement of pressure pulsation dampers in the main pressure lines proximate the braking pressure generator or in the shunt line of the electromagnetic inlet and outlet valves. The used pressure pulsation dampers are vibration-damping elastomeric energy accumulator elements which, due to their defined volume expansion, flow length and throttling properties, prevent the transmission of sound emissions, which result from valve switching frequencies, to the mass-loaded and, consequently, vibrating brake system.

A relatively soft pedal feel and the increase of the pedal travel are undesirable effects of the volume absorption of pressure fluid during the braking operation which is additionally caused by the above-described pressure pulsation dampers. FR-A-2680742 discloses the arrangement of each one electromagnetically controllable restrictor in the main brake line between the inlet and outlet valve and the wheel brake. Thus, the restrictor will adopt its operating position reducing the fluid flow to the wheel brake in response to a control signal issued by a controlling and regulating electronic unit. When the restrictor maintains its above-mentioned operating position both in the phase of braking pressure increase and braking pressure reduction during anti-lock control operations, rapid pressure reduction in the wheel brakes is prevented by the restrictor effect. In lack of a sufficient re-acceleration ability of the wheel on surfaces having a low coefficient of friction, undesirable wheel lock can occur. A comparable circuit configuration is disclosed in EP-A-0 247 264.

DE-A-34 27 802 discloses a hydraulic brake system having an invariable restrictor in a return line connected to the suction side of the pump. The pressure fluid propagating from the braking pressure generator through a main pressure line to the wheel brakes flows through the invariable restrictor exclusively in the pressure reduction phase of a braking pressure control operation when the combination valve (comprising inlet valve and outlet valve) adopts the outlet valve position in which there is a pressure fluid connection between the wheel brakes and the return line leading to the suction side of the pump.

U.S. Pat. No. 4,957,330 discloses a hydraulic brake system with slip control having a control piston in a housing which includes both a pressure port of the master cylinder and a pressure port of the wheel brake for achieving the controllable restrictor function, so that the control piston, as a function of the pressure difference on both end surfaces of the control piston, varies the flow cross-section of the main pressure line which extends through the housing of the control piston. In any case, a restrictor function is ensured upon termination of the pressure maintenance phase of an anti-lock braking operation because the pressure difference on the control piston will then reach its maximum. The pressure modulation valve of the wheel brake is arranged separately of the controllable restrictor valve in the main pressure line.

Therefore, it is an object of the present invention to maintain a possibly unmodified simple basic structure of the nowadays customary brake systems and to provide a solution of effectively reducing the noise that is due to the valve operating positions, and the transmission of noise.

Thus, the present invention is based on the idea of reducing the pressure pulses of different intensity, caused by the switching frequencies of the valves, as a function of the pressure difference between the wheel brake and the braking pressure generator, by varying the flow cross-section between the inlet valve and the wheel brake by way of a controllable restrictor or throttle member.

DETAILED DESCRIPTION OF THE PREFERRED EMBODIMENT

Figure 1:
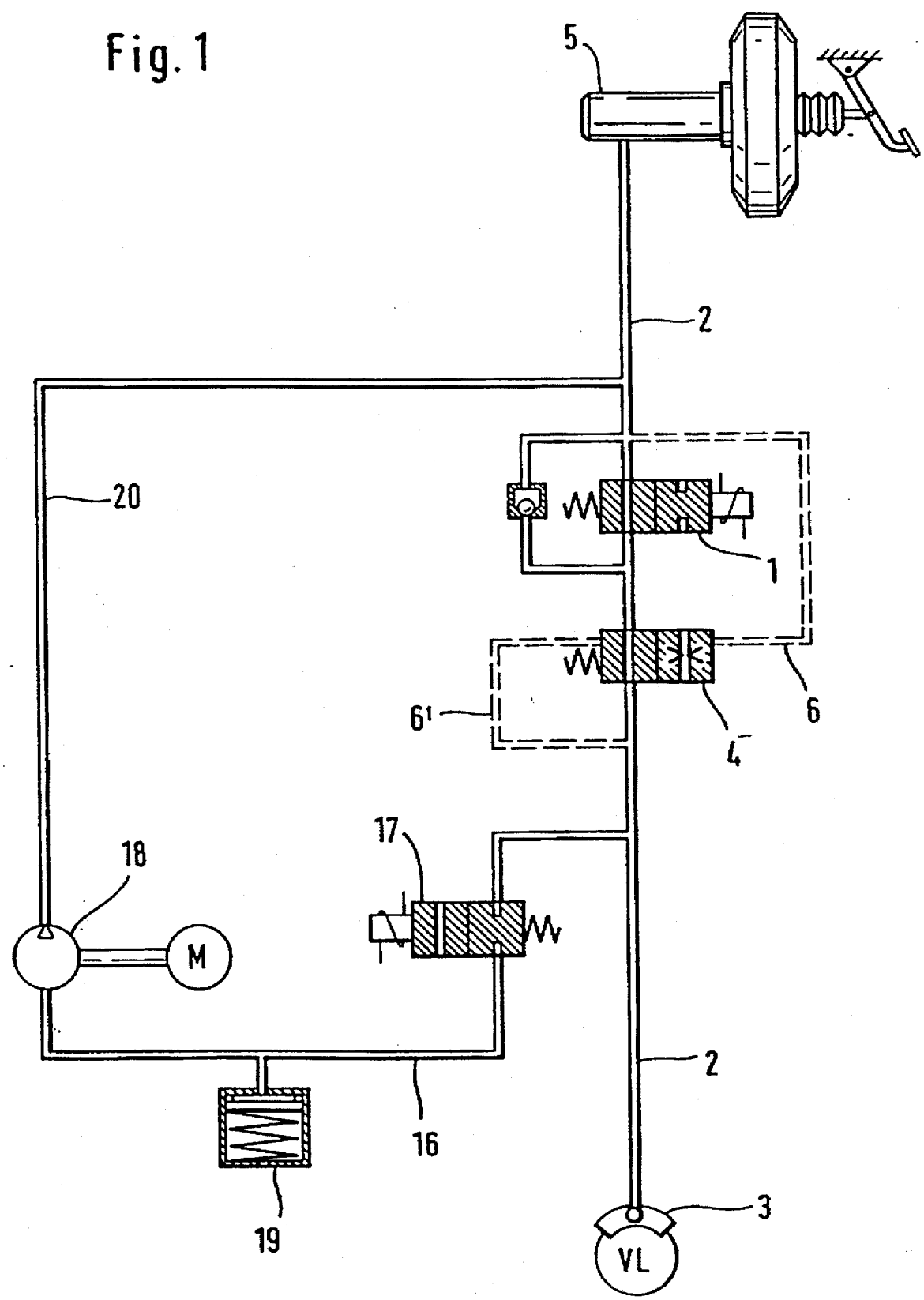
FIG. 1 is a hydraulic circuit of the brake system according to the present invention.

FIG. 1 is a schematic view of the hydraulic circuit for the brake system of the present invention. A braking pressure generator 5 is connected to a wheel brake 3 by way of a main pressure line 2. An inlet valve 1, which is electromagnetically open in the basic position, and a restrictor 4, which is connected downstream of the inlet valve 1 and is inoperative in the basic position, are comprised in the main pressure line 2. The controllable restrictor 4 is represented as a two-way/two-position directional control valve. A first control pressure port 6 is acted upon by the pressure of the braking pressure generator 5, and a second, counteracting control pressure port 6' of the two-way/two-position directional control valve is acted upon by the pressure in the wheel brake 3.

A compression spring 7, shown symbolically on the 2/2-way valve, ensures that the pressure fluid flow to the wheel brake 3 is initially unthrottled. In addition, a return line 16 is connected to the wheel brake 3 and is connected to the suction side of an auxiliary-pressure pump 18 by way of an electromagnetic outlet valve 17 which is closed in its basic position. Further, the return line 16 has a low-pressure accumulator 19 for the intermediate storage of excessive pressure fluid volume. The pressure side of the auxiliary-pressure pump 18 is connected to the braking pressure generator 5 by way of an auxiliary-pressure line 20 and, in turn, to the main pressure line 2. The valve configuration according to the present invention permits reducing the valve operating noises caused in the inlet valve 1 as soon as the restrictor 4 in the main pressure line 2 becomes operative during the switching operation of the inlet valve and in dependence on a change-over point defined by construction. In this arrangement, the restrictor function becomes operative as defined by design criteria of the brake system, for example, with an increasing pressure difference of more than 15 bar.

Figure 2:
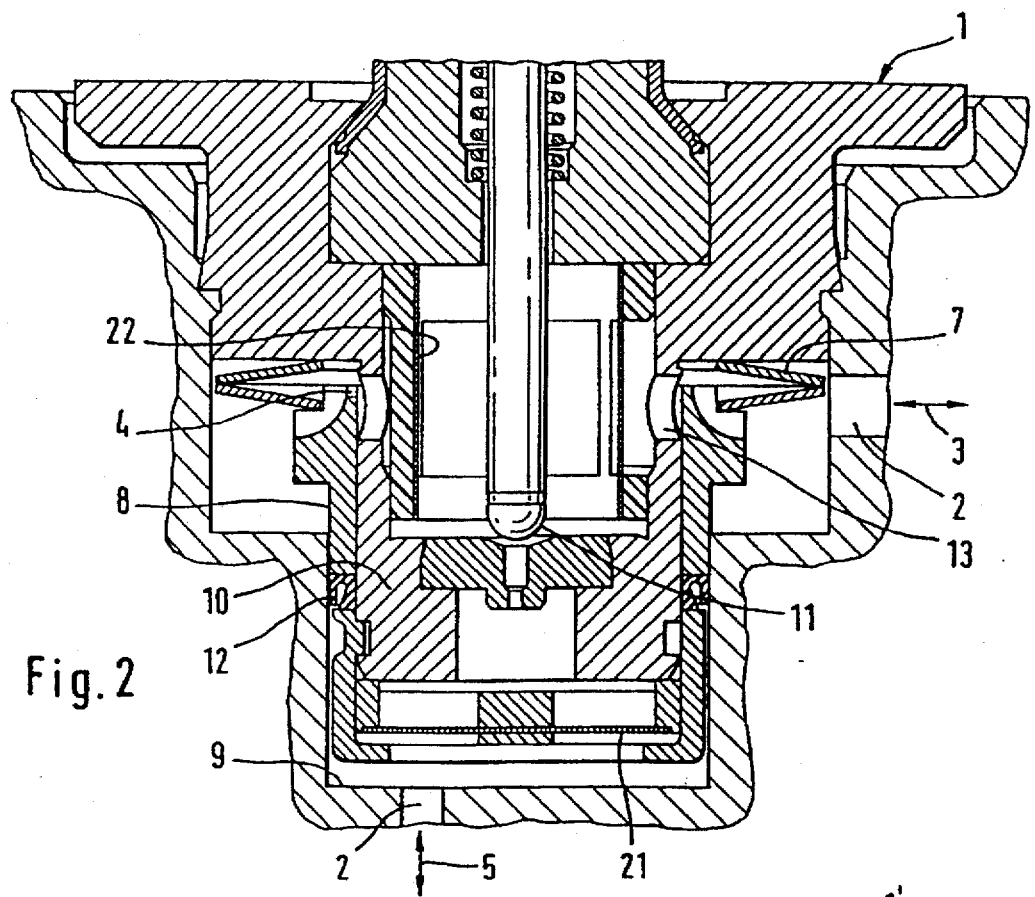
FIG. 2 is a partial cross-sectional view of an inlet valve of the brake system according to the present invention.

FIG. 2 shows a constructive embodiment for integrating the restrictor function in the inlet valve 1. The inlet valve 1 has a valve carrier 10 comprising the valve closure member 11 and the channel guide of the main pressure line 2. Preferably, the valve carrier 10 is integrated in a valve-accommodating member 9 in a cartridge-type construction. Pressure fluid in the main pressure line 2 propagates from the symbolically shown braking pressure generator 5 through a plate-type filter 21, the open valve closure member 11, the annular filter element 22 inserted in the valve carrier 10 to a transverse bore 13 which, as a functional component of the main pressure line 2, is partially overlapping with the annular piston 8 in FIG. 2. Due to its notch in the front end (restrictor 4), the annular piston 8 performs the restrictor function and, accordingly, varies the stroke of the annular piston 8 and, thus, the flow cross-section between the transverse bore 13 and the end surface of the annular piston as a function of the differential pressure. The annular piston 8 is radially guided on the extension of the valve carrier 10 and, by the action of a compression spring 7, is supported on an annular seal 12 acting as a non-return cup seal between the stepped bore of the valve-accommodating member 9 and the extension. The annular seal 12 performs the pressure-relief function of the non-return valve, which is arranged in parallel to the inlet valve in FIG. 1 and opens in the direction of the braking pressure generator 5, in a particularly compact construction. The plate-type filter 21 is attached by way of a retaining bowl caulked on the extension, permitting the use of the retaining bowl for the direct adjustment of the annular piston 8 in a favorable manner. This reduces the assembly tolerance for the closure travel of the annular piston 8. The compression spring 7 is compressed as a poppet spring pair between the enlarged end surface portion of the valve carrier 10 and the adjacent end surface of the annular piston 8 in a manner which optimizes mounting space requirements.

Figure 3:
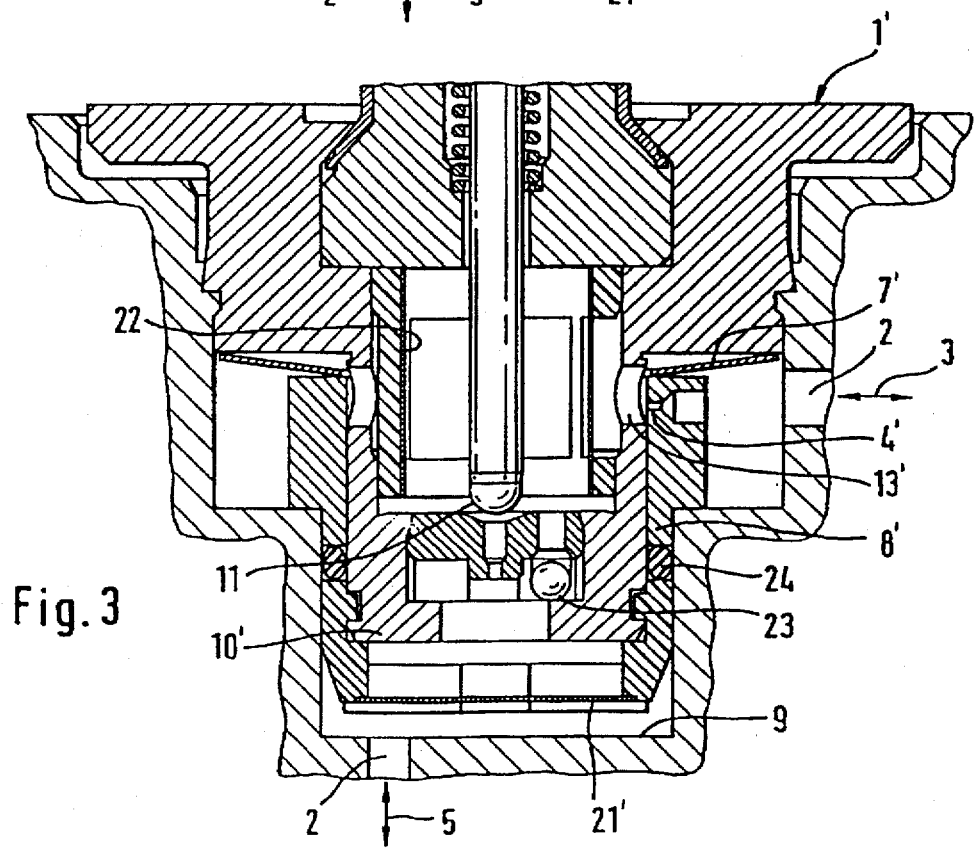
FIG. 3 is another partial view of an alternative embodiment of the inlet valve.

In contrast to FIG. 2, the restrictor function in FIG. 3 is performed by a restrictor bore extending through the peripheral surface of the annular piston 8' so that, with increasing hydraulic differential pressure, the annular piston 8' is displaced upwardly in opposition to the compression spring 7', the transverse bore 13' becoming overlapped and the flow cross-section being reduced to the size of the restrictor bore. As an alternative of FIG. 2, the plate-type filter 21 in FIG. 3, as a plastic part, is snapped onto the periphery of the valve carrier 10'. An O-ring 24 is placed on top of this arrangement so that the pressure-relief function described in FIG. 2 is by way of a spherical non-return valve 23 which is arranged separately in the valve carrier 10'. Thus, the O-ring 24 is exclusively intended to seal annular piston 8', and, additionally, it is retained by the annular filter 21.

Figure 4:
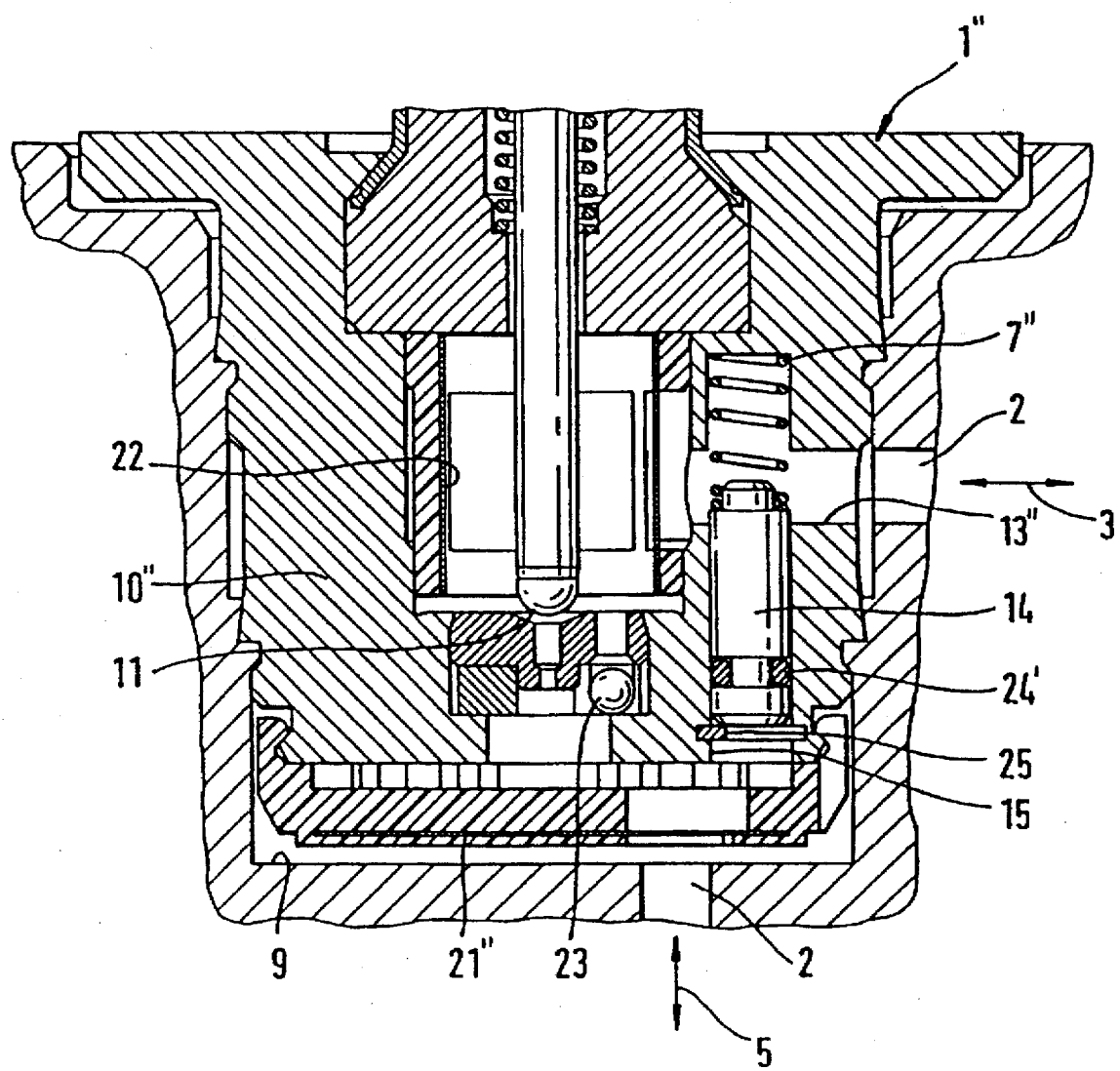
FIG. 4 is a cross-sectional view of another valve construction.

In contrast to the preceding embodiments of FIGS. 2 and 3, FIG. 4 shows another alternative construction to achieve the controllable restrictor or throttling function by way of a control piston 14, which is structurally arranged in parallel to the valve closure member 11. Control piston 14 is guided radially in the valve carrier 10', sealed at the piston stem by an O-ring 24, and it is supported with its end surface on a stop disc 25 snapped into the valve carrier 10'. The opposite end surface of the control piston 14 is acted upon by a compression spring 7' as in the preceding embodiments. This end surface is structurally formed so as to provide a restrictor flow cross-section in the transverse bore associated with the main pressure line 2. Thus, the control piston 14 will shut off the transverse bore 13' until the restrictor cross-section is reached, with an increasing pressure difference between the braking pressure generator 5 and the wheel brake 3. A feature of the described embodiment is the low-cost manufacture of the control piston 14 and the accommodating bore 15 arranged vertically to the transverse bore 13'. The valve carrier 10' is retained in the valve-accommodating member 9 by self-caulking in the embodiment shown. However, the valve can also be attached by using other variants of force-locking and/or form-locking connecting methods without the need for detailed explanations. The mode of operation of the brake systems described above is as follows:

When a braking action is initiated by depressing a brake pedal, braking pressure generator 5 causes a pressure to develop in the main pressure line 2 which propagates through open intake valve 1,1', 1" unrestricted to the wheel brake 3. When the braking action is to be terminated, the brake pedal is released and the pressure in the main pressure line 2 decreases as fluid returns to pressure generator 5.

During a slip control condition, an imminent locked condition of the vehicle wheel has been detected. Inlet valve 1,1',1" and outlet valve 17 will be actuated in accordance with a predefined control characteristic, so as to prevent locking of wheel brake 3. Restrictor 4,4',4" allows unrestricted pressure flow toward the wheel brake 3 under normal conditions. However, restrictor 4,4',4" is actuated to a restricting position when wheel brake pressure at control pressure port 6' exceeds the generated pressure at control pressure port 6 by a predetermined amount. In this way pressure is delivered to the wheel brake 3 during slip control in an unrestricted fashion, but is returned in a restricted manner. Such an arrangement decreases unwanted noise.

The embodiments referred to hereinabove permit a particularly compact integration of controllable restrictor variants in the valve carrier 10 or the valve-accommodating member 9, without requiring intricate modifications to the valve construction.

We claim:
1. A hydraulic brake control system with slip control, comprising:
   a braking pressure generator which is hydraulically connected to at least one wheel brake by way of a main pressure line,
   a return line connected to the wheel brake and to a pressure-fluid collecting means,
   an auxiliary-pressure pump having an auxiliary-pressure line and being hydraulically connected to the braking pressure generator, and
   inlet and outlet valves inserted into the main pressure line and the return line, said inlet valve including a valve closure member and a valve carrier having at least one transverse bore,
   a controllable restrictor connected to the main pressure line downstream of the inlet valve closure member, said restrictor adopting predetermined operating positions as a function of a defined hydraulic pressure difference between the wheel brake and the braking pressure generator, said restrictor permitting an unhindered hydraulic fluid flow in the main pressure line to the wheel brake in a first operating position, while limiting the pressure fluid flow to the wheel brake in a second operating position, and
   said restrictor being arranged on a piston in said inlet valve wherein said piston is guided by at least a portion of said valve carrier for selectively restricting flow through said transverse bore.

2. A hydraulic brake system as claimed in claim 1 wherein the controllable restrictor can be operated by two opposedly acting control pressure ports, the first control pressure port being connected to the main pressure line in the area between the inlet valve and the braking pressure generator, and in that the second control pressure port is exposed to the wheel braking pressure.

3. A hydraulic brake control system as claimed in claim 1, further including a compression spring for defining the basic position of the controllable restrictor which adopts the first operating position when the brake is released.

4. A hydraulic brake control system as claimed in claim 1, wherein the piston is an annular piston and the controllable restrictor is a component part of the annular piston which is guided on a cylindrical extension of the valve carrier and is inserted into a valve-accommodating member and accommodates the valve closure member which is electromagnetically operable.

5. A hydraulic brake control system as claimed in claim 4, wherein a compression spring is compressed between a first end surface of the annular piston and an adjacent end surface of the valve carrier.

6. A hydraulic brake control system as claimed in claim 5, wherein the cylindrical extension of the valve carrier extends in a stepped bore of the valve-accommodating member, where the annular piston is radially guided and axially abutting.

7. A hydraulic brake control system as claimed in claim 6, further including an annular seal arranged between the extension and the stepped bore and abuts on a second end surface of the annular piston remote from the compression spring.

8. A hydraulic brake control system as claimed in claim 5, wherein the restrictor is arranged in the area of the first end surface of the annular piston which contacts the compression spring.

9. A hydraulic brake control system as claimed in claim 5, wherein the first end surface of the annular piston forms stroke-responsively a variable flow cross-section with the at least one transverse bore which extends radially through the valve carrier.

10. A hydraulic brake control system with slip control, comprising:

a braking pressure generator which is hydraulically connected to at least one wheel brake by way of a main pressure line, a return line connected to the wheel brake and to a pressure-fluid collecting means, an auxiliary-pressure pump having an auxiliary-pressure line and being hydraulically connected to the braking pressure generator, and inlet and outlet valves inserted into the main pressure line and the return line, said inlet valve including a valve carrier having a first fluid passage connected to the wheel brake, a second fluid passage connected to the braking pressure generator, and a valve closure member for selectively preventing communication between the first and second fluid passages, a controllable restrictor connected to the main pressure line, said restrictor adopting predetermined operating positions as a function of a defined hydraulic pressure difference between the wheel brake and the braking pressure generator, said restrictor permitting an unhindered hydraulic fluid flow in the main pressure line to the wheel brake in a first operating position, while limiting the pressure fluid flow to the wheel brake in a second operating position, and said restrictor being arranged on a piston in said inlet valve wherein said piston is guided by at least a portion of said valve carrier for selectively restricting flow through the first fluid passage to the wheel brake.

11. A hydraulic brake control system as claimed in claim 10, wherein the piston is a control piston arranged in parallel to the valve closure member, in an accommodating bore in the valve carrier extending transversely with respect to the main pressure line.

* * * * *